United States Patent
Li et al.

(10) Patent No.: US 7,844,008 B2
(45) Date of Patent: Nov. 30, 2010

(54) DELAYED BRANCH DECISION IN QUADRATURE DECOMPOSITION WITH M-SEARCHING

(75) Inventors: Wei Li, JiangSu Province (CN); Haifeng Wang, Oulu (FI); Jorma Lilleberg, Oulu (FI); Ming Chen, JiangSu Province (CN); Shixin Cheng, JiangSu Province (CN)

(73) Assignee: Nokia Corporation, Espoo (FI)

( * ) Notice: Subject to any disclaimer, the term of this patent is extended or adjusted under 35 U.S.C. 154(b) by 861 days.

(21) Appl. No.: 11/706,821

(22) Filed: Feb. 12, 2007

(65) Prior Publication Data
US 2008/0162902 A1 Jul. 3, 2008

Related U.S. Application Data

(60) Provisional application No. 60/877,501, filed on Dec. 28, 2006.

(51) Int. Cl.
*H04L 5/12* (2006.01)
*H04L 23/02* (2006.01)
(52) U.S. Cl. .................................. 375/265; 375/340
(58) Field of Classification Search .................. 375/265, 375/340–341, 349; 714/792
See application file for complete search history.

(56) References Cited

U.S. PATENT DOCUMENTS

| 6,597,743 B1* | 7/2003 | Khayrallah et al. ......... 375/265 |
| 7,380,199 B2* | 5/2008 | Haratsch ..................... 714/796 |
| 2007/0189424 A1* | 8/2007 | Haratsch ..................... 375/340 |
| 2007/0268980 A1* | 11/2007 | Brannstorm et al. ........ 375/265 |
| 2008/0075022 A1* | 3/2008 | Lei et al. ..................... 370/310 |

OTHER PUBLICATIONS

Thornben Detert: "An Efficient Fixed Complexity QRD-M Algorithm for MIMO-OFDM using Per-Survivor Slicing", 4th IEEE International Symposium on Wireless Communication Systems 2007, Oct. 16-19, 2007, pp. 572-576, XP031166834 IEEE, Piscataway, NJ, ISBN: 978-1-4244-0978-5.

(Continued)

*Primary Examiner*—Jean B Corrielus
(74) *Attorney, Agent, or Firm*—Harrington & Smith

(57) ABSTRACT

A QRD-M decomposition includes a first and a sequential second stage, at least. In the first stage, M branches are selected from among more than M branches entering the first stage as survive branches from which multiple decompositions are calculated. In the second stage, more than M branches are selected from among those branches entering the second stage as survive branches from which multiple decompositions are calculated. The symbol of the received signal is decided from a branch that is a survive branch of both the first and second stages. The second stage may be within a window that may include additional stages at which the pruning decision down to M survive branches is delayed. One or more windows may be used in a single QRD-M decomposition. In an embodiment, all branches entering the second stage are survive branches. It is shown that the marginal increased computational load increases accuracy.

26 Claims, 8 Drawing Sheets

OTHER PUBLICATIONS

Shengchao Li et al.: "Finite delay maximum snr breadth-first equalizer", IEEE 56$^{th}$, Vehicular Technology Conference Proceedings, Vancouver, Canada, Sep. 24-28, 2002, vol. 1, pp. 529-533, XP010608613 IEEE, New York, NY, ISBN: 978-0-7803-7467-6, the whole documents.

Kawai, H. et al., "Independent Adaptive Control of Surviving Symbol Replica Candidates at Each Stage Based on Minimum Branch Metric in QRM-MLD for OFCDM MIMO Multiplexing", 2004 IEEE, pp. 1558-1564.

Dai, Y. et al., "A Comparative Study of QRD-M Detection and Sphere Decoding for MIMO-OFDM Systems", 2005 IEEE 16$^{th}$ International Symposium on Personal, Indoor and Mobile Radio Communications, pp. 186-190.

Kim, K. et al., "A QRD-M/Kalman Filter-Based Detection and Channel Estimation Algorithm for MIMO-OFDM Systems", IEEE Transactions on Wireless Communications, vol. 4, No. 2, Mar. 2005, pp. 710-721.

Chin, W. H., "QRD Based Tree Search Data Detection for MIMO Communication Systems", 2005 IEEE, 4 pages.

Guo, Y. et al., "Reduced QRD-M Detector in MIMO-OFDM Systems With Partial and Embedded Sorting", 2005 IEEE Globecom, pp. 187-192.

Yue, J. et al., "Channel Estimation and Data Detection for MIMO-OFDM Systems", 2003 IEEE Globecom, pp. 581-585.

Wolniansky, P. W. et al., "V-Blast: An Architecutre for Realizing Very High Data Rates Over the Rich-Scattering Wireless Channel", IEEE 1998, pp. 295-300.

* cited by examiner

DELAYED BRANCH DECISION IN QUADRATURE DECOMPOSITION WITH M-SEARCHING

CROSS REFERENCE TO RELATED APPLICATION

This applications claims priority to U.S. Provisional Patent Application Ser. No. 60/877,501, filed on Dec. 28, 2006, the contents of which are hereby incorporated in their entirety.

TECHNICAL FIELD

The exemplary and non-limiting embodiments of this invention relate generally to wireless communication systems and, more specifically, relate to QuadRature Decomposition based M-searching signal detecting (QRD-M); M being a number of branches selected in the search.

BACKGROUND

A multiple-input multiple-output (MIMO) system can provide significant performance gain on the system capacity over the traditional single-input single-output system (SISO); therefore the MIMO system can be a preferred solution to support higher data rate transmission in communications.

However, due to the multi-antenna interference in the receiver, the traditional linear equalizer cannot achieve optimal performance. There are numerous proposals regarding how to improve the signal detecting performance in MIMO communications. These proposals comprise serial interference cancellation, and parallel interference cancellation, among which maximum likelihood sequence detecting (MLSD) is the optimal solution in the sense of minimizing the error probability with impractical high complexity.

SUMMARY

In accordance with one embodiment is a method that includes receiving a signal, processing the signal using a multi-stage quadrature decomposition search, and deciding a symbol of the received signal. Processing the signal using the multi-stage quadrature decomposition search includes for a first stage, selecting M branches from among more than M branches entering the first stage as survive branches from which multiple decompositions are calculated, where M is an integer greater than one; and for a second stage sequential with the first stage, selecting more than M branches from among those entering the second stage as survive branches from which multiple decompositions are calculated. The symbol of the received signal is decided from a branch that is a survive branch of both the first and second stages.

In accordance with another embodiment is a computer program product of machine-readable instructions, tangibly embodied on a computer readable memory and executable by a digital data processor, to perform actions directed toward performing a multi-stage quadrature decomposition search. The actions include the following for an input signal. For a first stage, selecting M branches from among more than M branches entering the first stage as survive branches from which multiple decompositions are calculated, where M is an integer greater than one. For a second stage sequential with the first stage, selecting more than M branches from among those entering the second stage as survive branches from which multiple decompositions are calculated. Further, the actions include deciding a symbol of the received signal from a branch that is a survive branch of both the first and second stages.

In accordance with another embodiment is an integrated circuit, which includes a multi-stage quadrature decomposition circuit adapted to process an input signal by the following. For a first stage, selecting M branches from among more than M branches entering the first stage as survive branches from which multiple decompositions are calculated, where M is an integer greater than one. For a second stage sequential with the first stage, selecting more than M branches from among those entering the second stage as survive branches from which multiple decompositions are calculated. The circuit is further adapted to decide a symbol of the received signal from a branch that is a survive branch of both the first and second stages.

In accordance with another embodiment is an apparatus that includes a processor adapted to process an input signal using a multi-stage quadrature decomposition search by the following steps. For a first stage, selecting M branches from among more than M branches entering the first stage as survive branches from which multiple decompositions are calculated, where M is an integer greater than one. For a second stage sequential with the first stage, selecting more than M branches from among those entering the second stage as survive branches from which multiple decompositions are calculated. The processor is further adapted to decide a symbol of the received signal from a branch that is a survive branch of both the first and second stages.

In accordance with another embodiment is an apparatus that includes means for receiving a wireless signal and means for decomposing the received signal. Decomposing the received signal is according to a multi-stage quadrature decomposition, characterized in that for a first stage, selecting M branches from among more than M branches entering the first stage as survive branches from which multiple decompositions are calculated, where M is an integer greater than one. Further, the received signal is decomposed in a second stage, sequential with the first stage, by selecting more than M branches from among those entering the second stage as survive branches from which multiple decompositions are calculated. A symbol of the received signal is decided from a branch that is a survive branch of both the first and second stages.

DETAILED DESCRIPTION

In this document there is disclosed an exemplary embodiment of the invention, a QRD-M search algorithm with branch delayed decision, and its complexity and link analysis. It can be seen that the presently preferred scheme can improve the system performance significantly versus the conventional one with the same number of branches retained in the search (the M value). With high-order modulation (e.g. 16QAM) and relative larger M value (e.g. 8), the improved scheme with M as 4 has approximately the same performance as the conventional scheme with M as 8 but the complexity can be reduced by half.

The invention can be implemented in MIMO OFDM-type communications, such as those most suitable for MIMO Long term evolution (LTE)/WiMAX/ . . . etc. There is a sliding window applied for a QRD-M detector to make a final decision jointly over multi-layers. The invention can be embodied in and practiced by a MIMO receiver.

A MIMO-OFDM communication system model, using MLSD and a conventional QRD-M searching scheme is introduced in the material below. In addition, an illustration of an exemplary embodiment of the invention is presented in section 3. Also, a complexity analysis of the invention is presented in section 4. Simulation results and conclusions are presented at sections 4 and 5.

MIMO-OFDM System Model.

Figure 1:
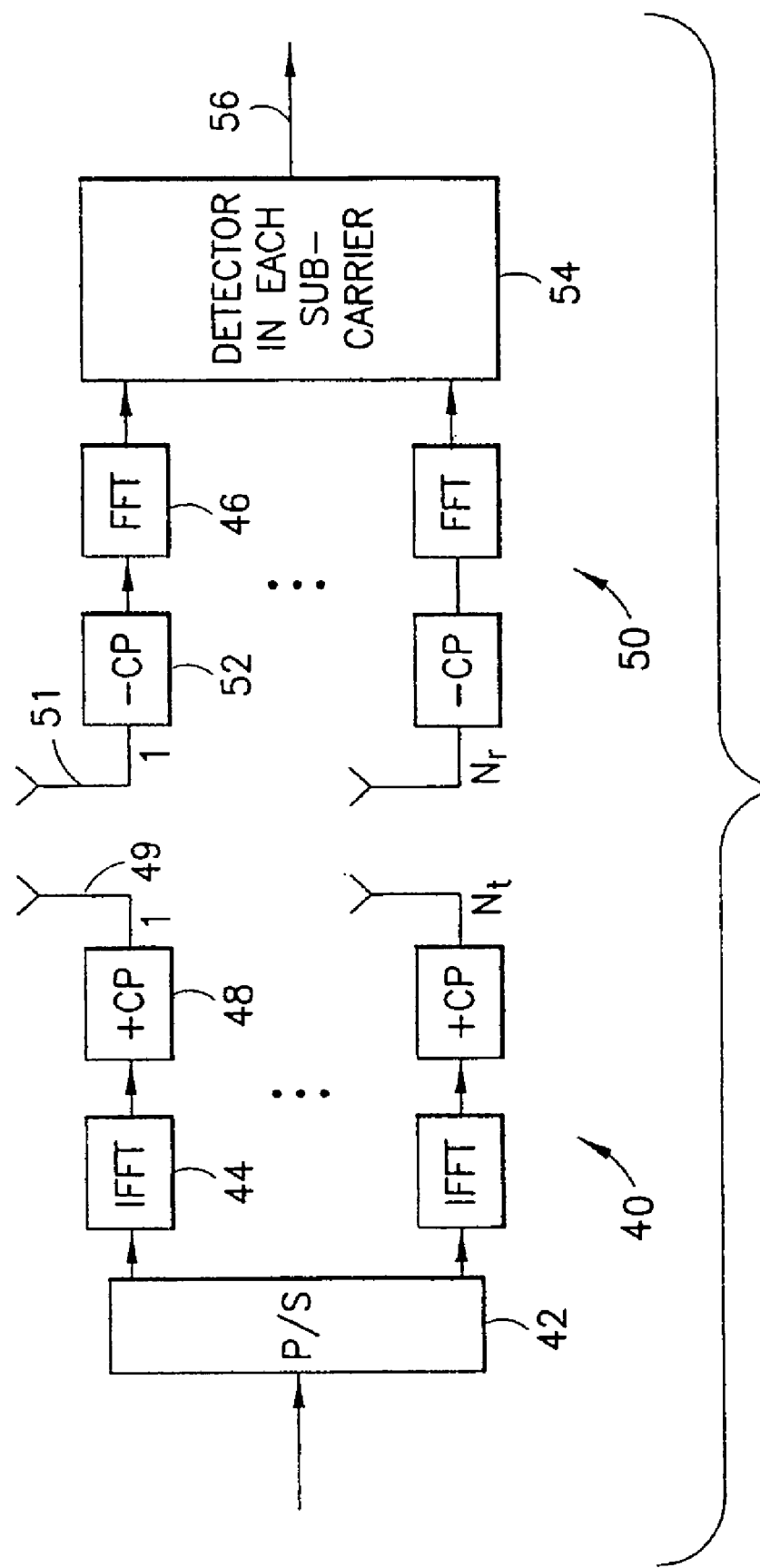
FIG. 1 shows a simplified block diagram of MIMO-OFDM system.

FIG. 1 is a block illustration of the MIMO-OFDM system model. In FIG. 1, the MIMO-OFDM system with $N_t$ transmit and $N_r$ receive antennas ($N_t \leq N_r$), is shown. The following abbreviations for FIG. 1 are herewith defined:

| | |
|---|---|
| P/S | parallel to serial converter 42; |
| IFFT/FFT | (inverse 44) fast fourier transform 46; |
| +/−CP | add 48 or remove 52 cyclic prefix block. |

Within the transmitter 40, the signal is serialized at the P/S 42 into the various data streams, each of which passes through an IFFT block 44 and a +CP block 48 where a cyclic prefix is added to each. Each stream is transmitted via one of the transmit antennas 49 (1, 2, . . . $N_t$), and the transmit signals x picks up Gaussian noise in the wireless channel. At the receiver 50, the received signal vector components y are received at the various receive antennas 51 (1, 2, . . . $N_r$), the cyclic prefix is removed at the −CP block 52, and a (forward) fast Fourier transform is executed in parallel on each of the received streams at the FFT blocks 46. The symbol for each of the sub-carriers is determined from the received and transformed streams at a detector block 54. The decomposition according to these teachings would typically take place in that detector block 54, where branch decisions are made and pruned to detect and output 56 the proper symbol.

Assuming perfect timing and frequency synchronization, the received signal at each sub-carrier can be formulated as $$y = Hx + n \quad (2.1)$$

Where y and n are the $N_r$-size received signal vector and the additive white Gaussian noise (AWGN) vector with power $\sigma^2$, respectively. Vector x denotes the $N_t$-size transmitted signal vector. The MIMO channel matrix H is:

$$H = \begin{bmatrix} h_{0,0} & h_{0,1} & \cdots & h_{0,N_t-1} \\ h_{1,0} & \cdots & \cdots & \cdots \\ \cdots & \cdots & \cdots & \cdots \\ h_{N_r-1,0} & \cdots & \cdots & h_{N_r-1,N_t-1} \end{bmatrix}_{N_r,N_t} \quad (2.2)$$

Conventional MLSD and QRD-M Search.

With multi-stream interference (MSI) due to the signals from the different transmit antennas on the same sub-carrier and at the same time (t) interfering with each other, MLSD is the optimal receiver to minimize the error probability. MLSD performs vector decoding as (3.1) shows $$\hat{x} = \underset{x \in \Phi}{\operatorname{argmin}} \{\|y - Hx\|^2\} \quad (3.1)$$

Where $\Phi$ is the set including all possible values of x and the minimization is performed by searching all the possible constellation points $x \in \Phi$. It can be noticed that MLSD has complexity that is exponential to the number of transmit (Tx) antennas and modulation alphabets.

QR-decomposition based M-searching is a near-optimal scheme to achieve a good tradeoff between the system complexity and performance. The QR decomposition can be applied to the channel matrix H at each sub-carrier as $$H = QR, \quad (3.2)$$

where Q is a $N_r$ by $N_r$ sized unitary matrix and R is $N_r$ by $N_t$ sized matrix $$R = \begin{bmatrix} T \\ 0_{N_r-N_t,N_t} \end{bmatrix}_{N_r,N_t}, \quad (3.3)$$

where T is a $N_t$ by $N_t$ up-triangle matrix.

An up-triangle matrix is one whose non-zero elements form an upwards-extending triangle. For example, a square up-triangle matrix may be shown as:

$$T = \begin{bmatrix} t_{1,1} & t_{1,2} & \cdots & t_{1,4} \\ 0 & \ddots & \ddots & t_{2,4} \\ \vdots & \ddots & \ddots & \vdots \\ 0 & \cdots & 0 & t_{N,N} \end{bmatrix},$$

in which $t_{i,j}$ is always zero if $j < i$.

Multiplying (2.1) with $Q^*$ from left side (* denoting the conjugation transposition) and using both (3.2) and (3.3), it can be derived:

$$y = QRx + n \quad (3.4)$$
$$Q^* y = Q^* QRx + Q^* n$$
$$\begin{bmatrix} \tilde{y}_u \\ \tilde{y}_d \end{bmatrix} = \begin{bmatrix} T \\ 0 \end{bmatrix} x + \begin{bmatrix} \tilde{n}_u \\ \tilde{n}_d \end{bmatrix}$$

In the above convention for equation (3.4), $$Q^* y = \begin{bmatrix} \tilde{y}_u \\ \tilde{y}_d \end{bmatrix},$$

$\tilde{y}_u$ denotes the vector including elements in the first $N_t$ rows of $Q^* y$, and $\tilde{y}_d$ denotes the vector including elements in the rest of the rows of $Q^* y$. The subscripts u and d are used to denote the top and bottom part of the overall vector.

Ignoring the bottom part of equation (3.4), we get $$\tilde{y}_u = Tx + \tilde{n}_u. \quad (3.5)$$

Because T is an up-triangle matrix, the MLSD algorithm is exactly equivalent to a tree searching problem to find the leaf note holding the minimum metric as $$x = \underset{x}{\operatorname{argmin}}\{\|\tilde{y}_u - Tx\|^2\}. \quad (3.6)$$

QRD-M is presented as a breadth-first tree searching algorithm in two relevant papers, hereby incorporated by reference: Chin W. H., "*QRD Based Tree Search Data Detection for MIMO Communication Systems*," VEHICULAR TECHNOLOGY CONFERENCE, 2005. VTC 2005-Spring; and Kyeong Jin Kim, Jiang Yue, Iltis R. A. and Gibson J. D., "*A QRD-M/Kalman Filter-Based Detection and Channel Estimation Algorithm for MIMO-OFDM Systems*," IEEE TRANSACTIONS ON WIRELESS COMMUNICATIONS, Vol. 4, March 2005.

Figure 2:
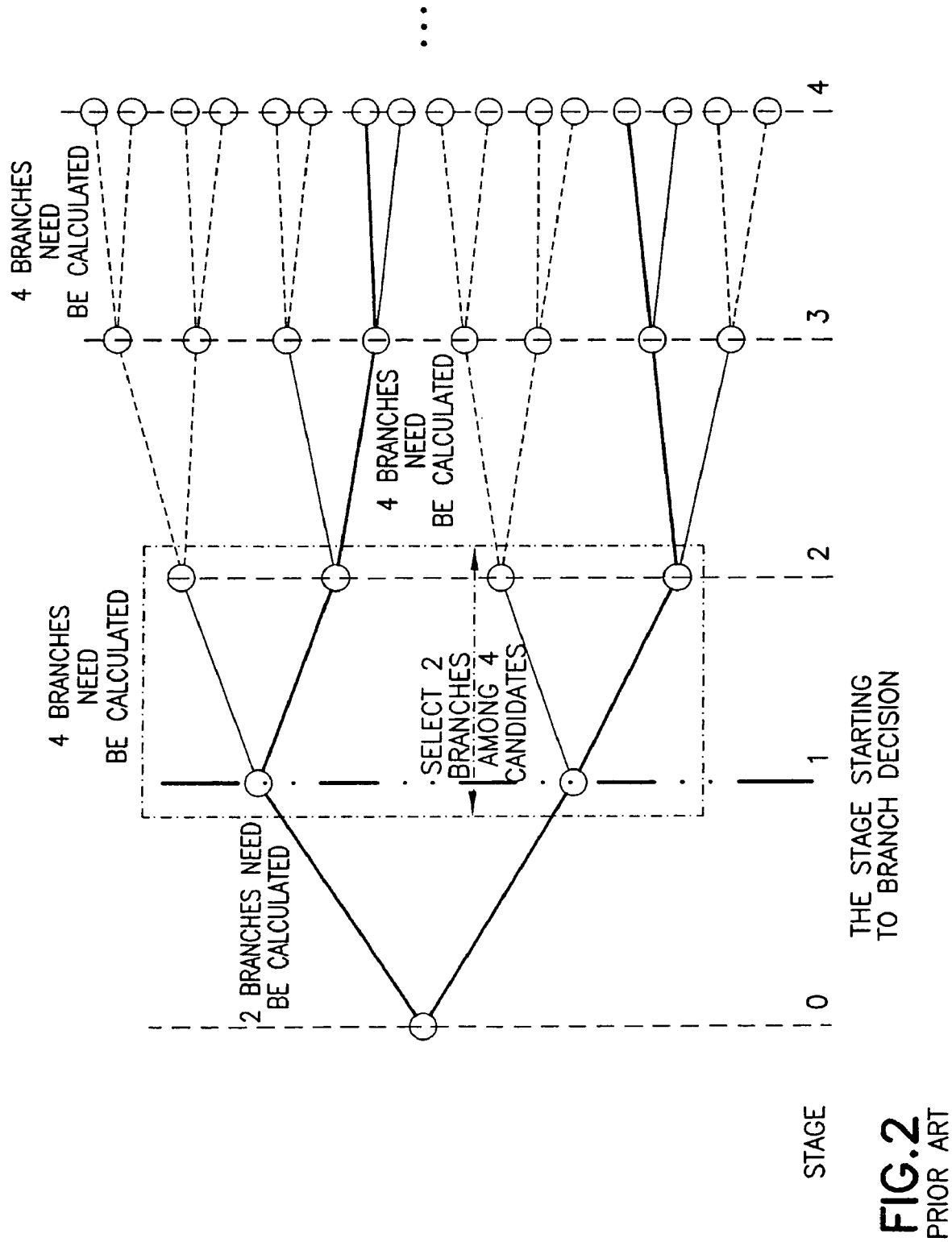
FIG. 2 is a schematic of a prior art QRD-M search with M as 2.

It reduces system complexities, as opposed to the MLSD algorithm, by keeping only a fixed number of candidates with the smallest accumulated metrics at each stage of the tree searching. Conclusively, the QRD-M searching algorithm can be summarized as follows:

1) Perform QR decomposition on H
2) Use Q* multiplying y from left side
3) Extend the reserved branches to the next stage
4) Calculate all branch metrics followed all the survive branches
5) Select M branches with the least metrics as survivor
6) (Go to step 3) until the final stage has been reached.
7) Select the branch with the least metrics as output In FIG. 2 there is shown a Conventional QRD-M search with M as 2, where solid lines between stages indicate survive branches and dashed lines indicate computational savings by pruning to M=2 at each branch, those branches that are never calculated. FIG. 2 illustrates a conventional QRD-M search example with QPSK modulation and M value as 2.

In FIG. 2, it can be noticed in the conventional QRD-M, the branch decision will be made immediately as the number of branches is larger than M. At each stage, 4 branches will be calculated and 2 will be selected as the survive branches. Stages are depicted as vertical lines 0, 1, 2, 3, and 4. As can be seen in FIG. 2, at stage 0 the MIMO signal is received, so no pruning is required since there is only one value which to decompose. In stage 0 is done two calculations, resulting in two values arriving at stage 1. Again, no pruning to M=2 is required at stage 1 since only two values are arriving. In stage 1, two values are computed from each of the two values entering stage 1, so four values enter stage 2. To reduce this expanding set of values on which calculation branches are performed, at stage 2 those four values are pruned to M=2, and from those two surviving values are computed four values to enter the next stage, stage 3. As can be seen, the dashed lines between stage 2 and 3 indicate computational savings by pruning to M=2 at stage 2. As with stage 2, a survive/discard decision is made at each further stage for each branch calculated from the immediately preceding stage. As can be seen at stage 3, pruning at earlier stages as well as at stage 3 reduces the computations there from sixteen potential branches to only four actually computed branches. Heavy solid lines indicate a survive decision, light solid lines indicate a calculated branch that is later discarded, and the dashed lines indicate calculations never made due to a discard decision made at an earlier stage.

Branch Delayed Decision in the QRD-M Search.

In this section a novel searching means is presented to improve the system performance of QRD-M searching by a delayed branch decision mode, but without increasing the M value or a number of survive branches that are further searched at later stages.

Figure 3:
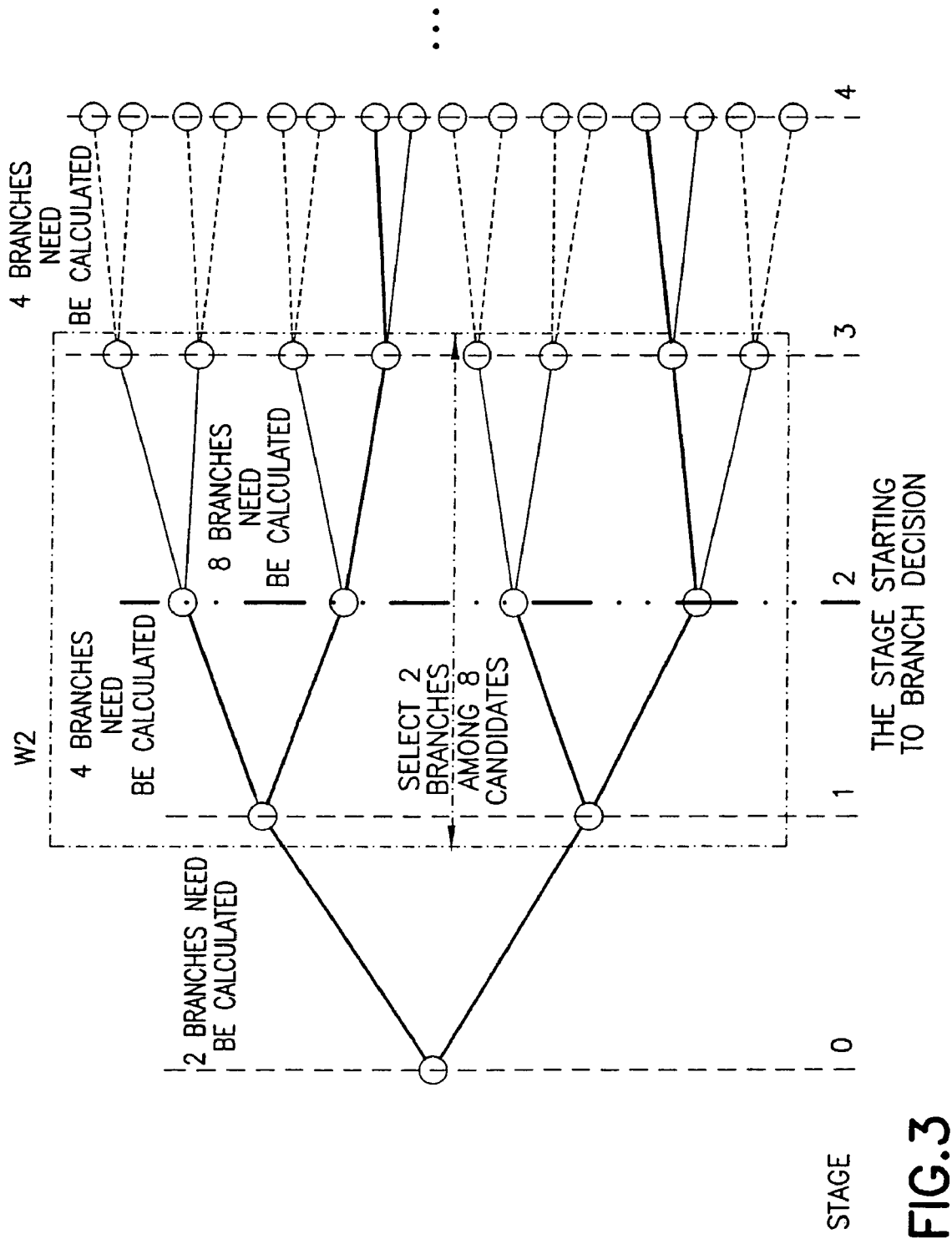
FIG. 3 is a schematic diagram of a QRD-M search with M as 2 according to an embodiment of the invention.

In FIG. 3 there is shown an exemplary embodiment of the invention. In FIG. 3 there is an improved QRD-M search with M as 2 and a delay d as 1 (pruning decision delayed one stage), where a heavy solid line illustrates survive branches and a light solid line illustrates a calculated decision branch that is discarded in this embodiment at the next stage. As with FIG. 2, dashed lines indicate calculations never made due to an earlier discard decision.

As compared to FIG. 2, the branch decision in FIG. 3 is delayed by one stage. In contrast to the conventional scheme where the discard/survive decision is made at each stage in order to prune each stage to M, the approach of FIG. 3 makes the decision during multiple stages within the window, e.g. during two stages when the delay d=1 stage as illustrated in FIG. 3. During two stages within the dotted window W2 twelve branches are calculated over two stages, and two are selected as the eventual survive branches as highlighted in heavy solid lines exiting from the window W2. Generally the size of the window (the delay or d value) could be varied based on practical implementation. A larger window size (d value) implies better QRD-M performance. Note that no survive/discard decision is made at stage 1 or stage 2 of FIG. 3.

Two options for practical implementation of the invention are then seen.

Alternative-1: after joint decision during multiple stages, the decision procedure is the exact same as the conventional one for the following stages. This is seen in FIG. 3, where at the end of the process window W2 (where d=1), the 8 calculated branches are pruned to M=2 and every stage thereafter imposes a survive/discard decision as M=2 surviving branches.

Alternative-2: the discard/survive decision will be always (or more than once) made during multiple stages even for the following stages. This is shown in FIG. 4, where multi-stage windows W1 and W2 follow one another in the same detector.

Complexity Analysis.

Figure 4:
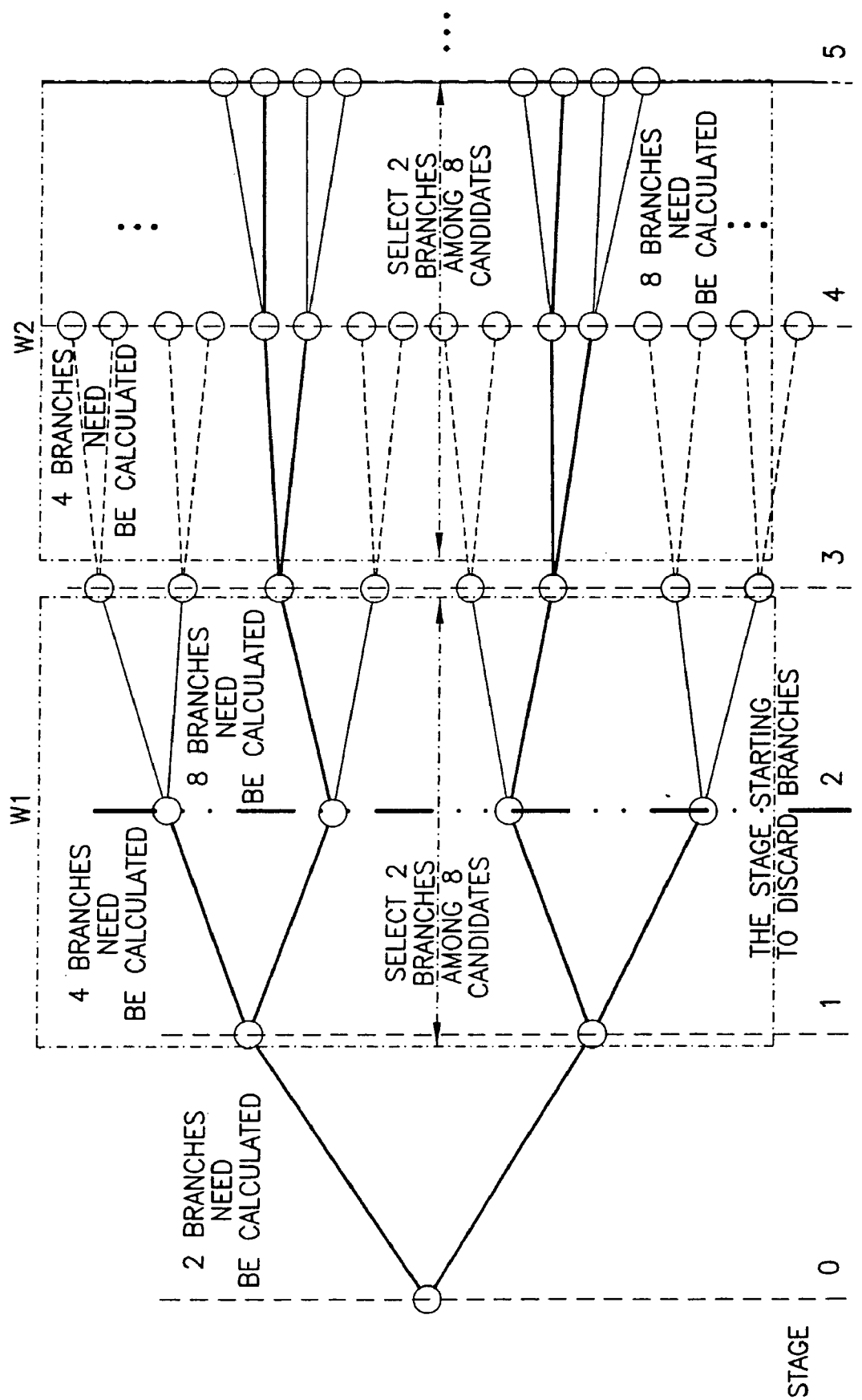
FIG. 4 is a schematic diagram of a QRD-M search with M as 2 according to another embodiment of the invention.

In FIG. 4 there is an improved QRD-M search with M as 2 and d as 1, where a heavy solid line illustrates survive branches and a light solid line illustrates discarded calculated branches for the alternatives solution. As earlier, non-calculated branches are indicated by a dashed line.

In FIG. 4 it can be noticed that the embodiment creates additional complexity for a branch delayed decision versus the conventional scheme of FIG. 2 with the same M value only at stages 2 and 4. The complexity was analyzed only for the scheme with the alternative-1 solution (FIG. 3) which employed additional calculations only at stage 2 as compared to FIG. 2. The QRD-M search is exactly the same as the conventional one during the following stages. The additional complexity depends on the number of delayed branches and the number of extended branches. Assuming the number of delayed branches is 1, we define K as the number of extended branches, M as the number of survive branches and N as the number of stages (N=2×Nt), respectively. The QRD-M branch decision metric according to this invention starts to preserve the survive branches and discard the rest of the branches during $d^{th}$ stage, where $$d=\lfloor \log_K(M) \rfloor \quad (5.1)$$

and where $\lfloor \ \rfloor$ denotes the rounding operation on the value towards zero.

The complexity of the prior art and the simpler (FIG. 3) embodiment are analyzed in following table 1 in both cases with enough and not enough caches assuming the same modulation for all the transmitted signals which have already been transformed into a real domain. The best case is that there are enough caches as needed to memorize all the possible values from Tx over the alphabet of the elements in x. Vice versa, in a worst case there are not enough caches to memorize the Tx value due to a limited memory buffer.

marized in Table 3 and 4 for best and worst cases, respectively.

TABLE 3

Complexity and required caches of the prior art and FIG. 3 approaches in the best cases.

| M value | Simpler QRD-M window (FIG. 3) | | Prior art (FIG. 2) | |
| --- | --- | --- | --- | --- |
| | Complexity | Cache | Complexity | Cache |
| 2 | 140 (+6%) | 88 | 132 | 76 |
| 4 | 236 (+25%) | 136 | 188 | 88 |
| 8 | 316 (+11%) | 136 | 284 | 104 |

TABLE 1

Complexity analysis of the prior art and the QRD-M approaches of FIGS. 3 and 4.

| | The best case (Having enough cache) | The worst case (Nothing cached) |
| --- | --- | --- |
| prior art QRD-M (FIG. 2) | $\left(\sum_{i=1}^{d+1} K^i + KM + KM(N-d-2)\right) + \left(\frac{N(N+1)}{2} \times \frac{K}{2}\right)$ | $\left(\sum_{i=1}^{d+1} K^i + KM + KM(N-d-2)\right) +$ $\left(K^{d+1}\sum_{i=1}^{d+1} i + KM\sum_{i=1}^{d+2} i + KM\left(\sum_{i=1}^{d+3} i + \ldots + \sum_{i=1}^{N} i\right)\right)$ |
| simpler QRD-M window (FIG. 3) | $\sum_{i=1}^{d+1} K^i + K^{d+2} + KM(N-d-2) + \left(\frac{N(N+1)}{2} \times \frac{K}{2}\right) \approx$ $\sum_{i=1}^{d+1} K^i + K^2M + KM(N-d-2) + \left(\frac{N(N+1)}{2} \times \frac{K}{2}\right)$ | $\left(\sum_{i=1}^{d+1} K^i + K^{d+2} + KM(N-d-2)\right) +$ $\left(K^{d+2}\sum_{i=1}^{d+2} i + KM\left(\sum_{i=1}^{d+3} i + \ldots + \sum_{i=1}^{N} i\right)\right) \approx$ $\left(\sum_{i=1}^{d+1} K^i + K^2M + KM(N-d-2)\right) +$ $\left(K^2M\sum_{i=1}^{d+2} i + KM\left(\sum_{i=1}^{d+3} i + \ldots + \sum_{i=1}^{N} i\right)\right)$ |
| Additional complexity (FIG. 4) | $K^{d+2} - KM \approx$ $K^2M - KM$ | $(K^{d+2} - KM) + \left(K^{d+2}\sum_{i=1}^{d+2} i - K^{d+1}\sum_{i=1}^{d+1} i - KM\sum_{i=1}^{d+2} i\right) \approx$ $(K^2M - KM) + \left(K^2M\sum_{i=1}^{d+2} i - KM\sum_{i=1}^{d+1} i - KM\sum_{i=1}^{d+2} i\right)$ |

In the best case, the numbers of required caches for the prior art and the approaches of FIG. 3 and FIG. 4 are summarized in Table 2.

TABLE 2

Caches required by the prior art and the FIG. 3/FIG. 4 approaches.

| conventional QRD-M | $\frac{N(N+1)}{2} \times \frac{M}{2} + MK$ |
| --- | --- |
| simpler QRD-M | $\frac{N(N+1)}{2} \times \frac{M}{2} + K^{d+2} \approx \frac{N(N+1)}{2} \times \frac{M}{2} + K^2M$ |
| Additional cache | $K^{d+2} - KM \approx K^2M - KM$ |

Assuming 16QAM modulated signals in a 4×4 MIMO system, the complexity of the prior art and the presently preferred QRD-M schemes with K=4, N=8 and d=2 are sum-

TABLE 4

Complexity and required caches of the prior art and simpler QRD-M of this invention, in the worst cases.

| M value | Simpler QRD-M window (FIG. 3) | Prior art (FIG. 2) |
| --- | --- | --- |
| 2 | 1044 (+2.8%) | 1016 |
| 4 | 2308 (+14.3%) | 2020 |
| 8 | 4148 (+4.5%) | 3972 |

Numerical Simulations.

The prior art and the simpler FIG. 3 approach are analyzed by numerical simulations in this section, where the simulation specifications are summarized in Table 1.

TABLE 5

Simulation specifications.

| | |
|---|---|
| Systems | MIMO-OFDM 4 × 4 antennas |
| | Conventional QRD-M algorithm (FIG. 2 approach) |
| | Simpler proposed QRD-M algorithm with branch decision delay as 1(FIG. 3 approach, one delay window,) |
| Sampling Rate | 5 MHz |
| Block Size | 256 Symbols |
| CP Size | 32 symbols |
| Carrier Frequency | 2.3 GHz |
| Modulation | QPSK, 16QAM |
| Channel State | Power Distribution Profile: ITU-VA Quasi-static in each data block |
| Channel estimation | Perfect |
| Channel feedback | Perfect |
| number of Survived branches (M) | 2, 4, 8 |

Figure 5:
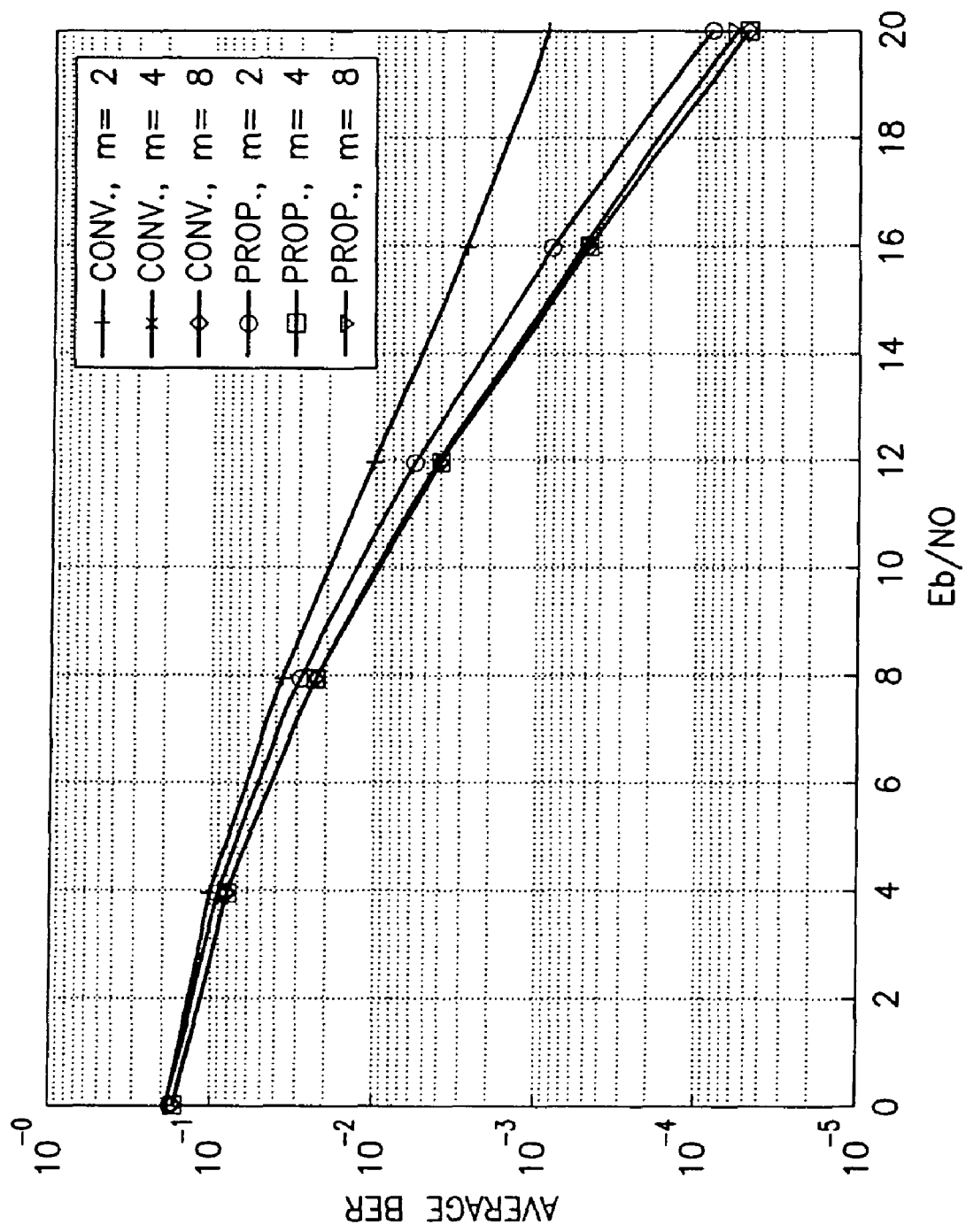
FIG. 5 is a BER Comparison in QPSK modulation.
Figure 6:
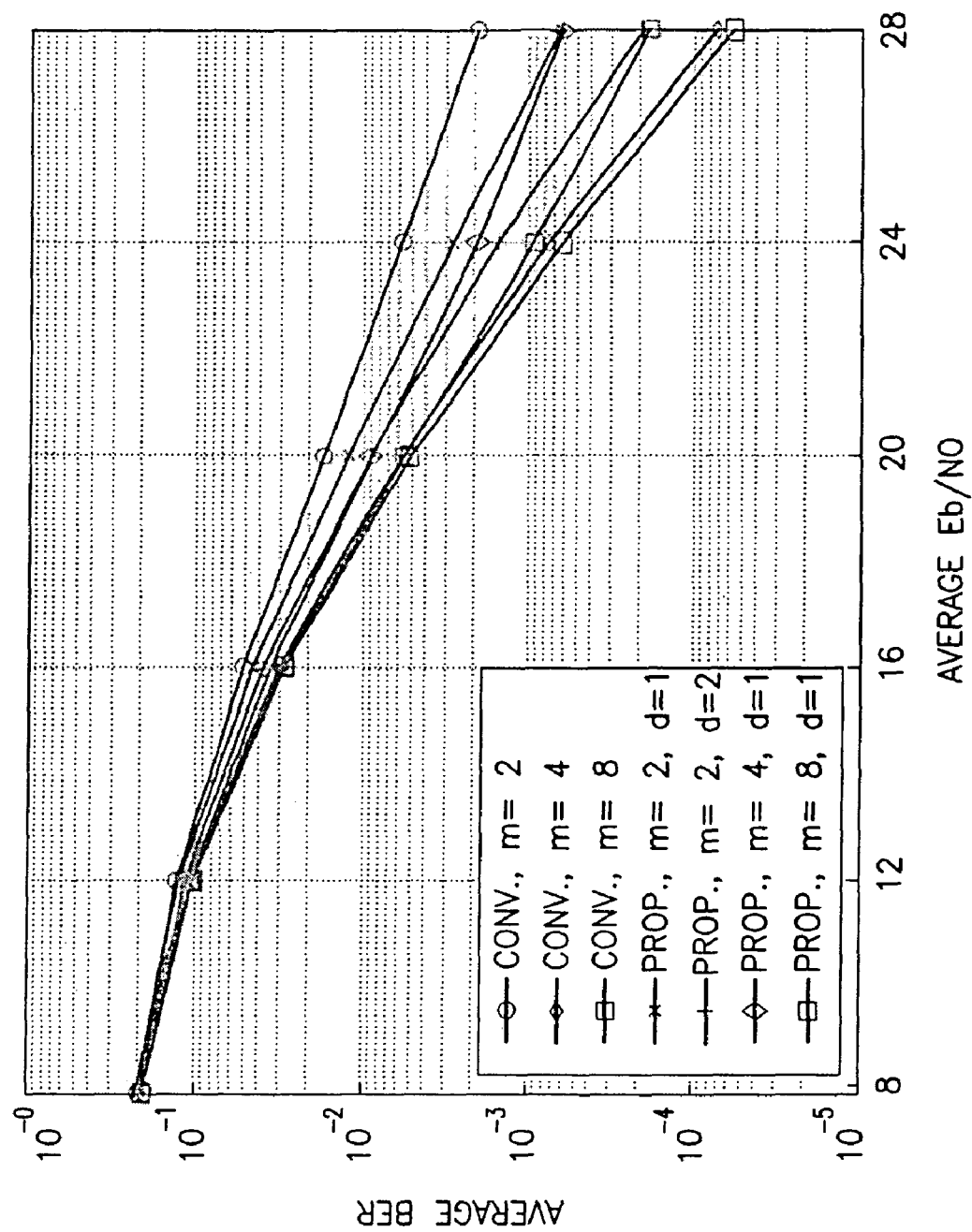
FIG. 6 is a BER Comparison in 16QAM modulation.

FIGS. 5 and 6 illustrate the bit error rate (BER) performance of the prior art and simpler (single window) approach versus Eb/No in cases of QPSK and 16QAM modulations. In QPSK with a small M value such as 2, it is seen that the simpler single window of FIG. 3 can outperform the prior art of FIG. 2 by about 1.8 dB for a $10^{-2}$ target BER level. With the larger M value such as 4 or 8 relative to a modulation alphabet, the performance gain is less pronounced because the prior art QRD-M algorithm already approaches the performance of a MLSD receiver. In the case of 16QAM with M as 2 and 4, the single window scheme can obtain ~1.6 dB gain. In the case of 16QAM with M as 8, the single window scheme can also improve the system performance by ~0.3 dB. Additionally, it can be noticed that the single window scheme with M=4 and d=1 has approximately the same performance as the conventional one with M=8. It implies that the receiver complexity can be reduced by half with the single window scheme as seen in Table 3.

Figure 7:
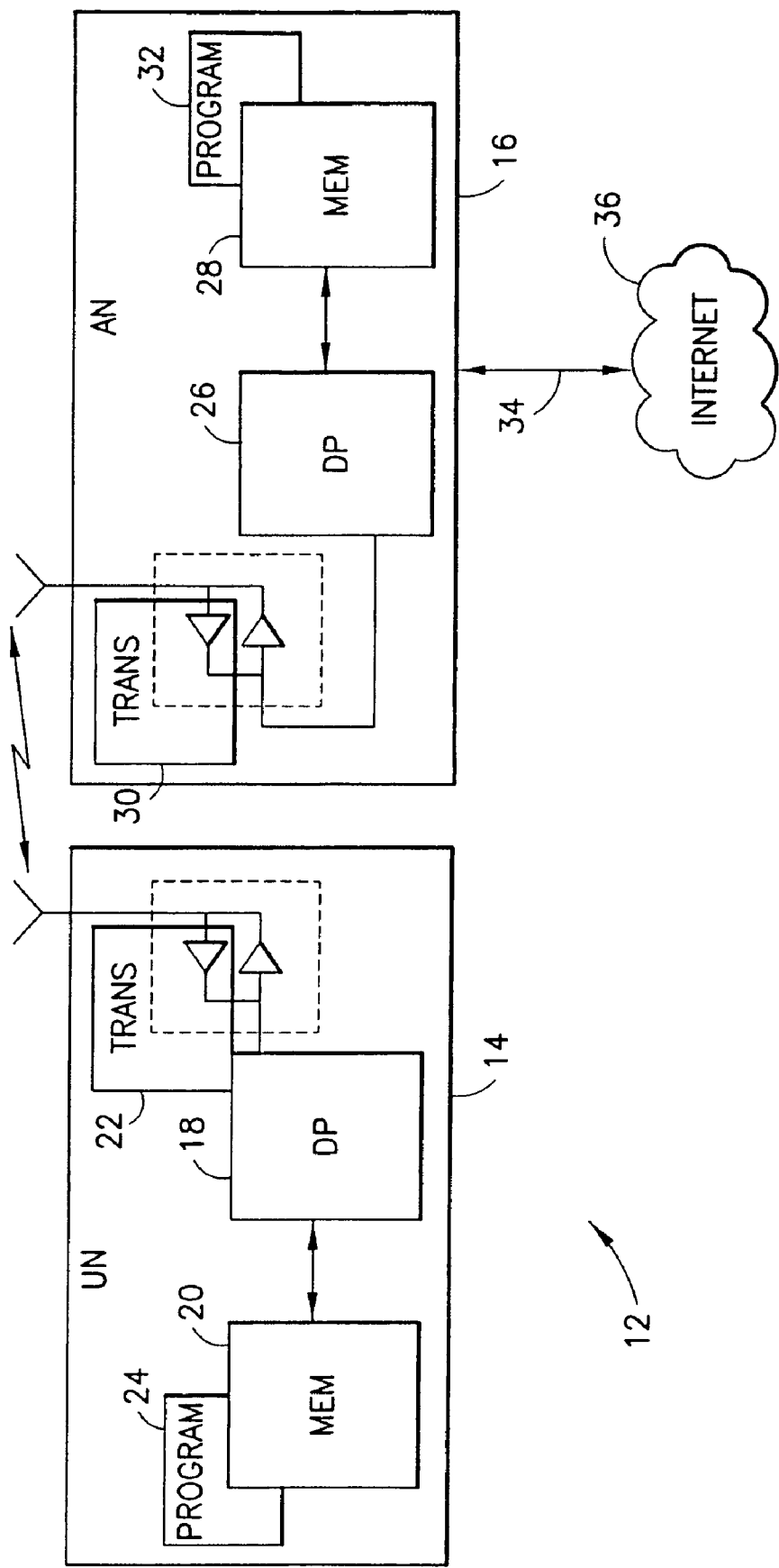
FIG. 7 is a simplified block diagram of various electronic devices that are suitable for use in practicing the embodiments of this invention.

Reference is made to FIG. 7 for illustrating a simplified block diagram of various electronic devices that are suitable for use in practicing the exemplary embodiments of this invention, where the DP 18, 26 are assumed to provide processing, or at least support processing, as detailed herein for the sub-carrier detectors from FIG. 1. In FIG. 7 a wireless network 12 is adapted for communication with a user equipment (UE) 14 via an access node (AN) 16. The UE 14 includes a data processor (DP) 18, a memory (MEM) 20 coupled to the DP 18, and a suitable RF transceiver (TRANS) 22 (having a transmitter (TX) and a receiver (RX)) for bidirectional wireless communications with the AN 16. The MEM 20 stores a program (PROG) 24. Note that the TRANS 22 has at least one antenna to facilitate communication. The AN 16 includes a data processor (DP) 26, a memory (MEM) 28 coupled to the DP 26, and a suitable RF transceiver (TRANS) 30 (having a transmitter (TX) and a receiver (RX)) for bidirectional wireless communications with the UE 14. The MEM 28 stores a program (PROG) 32. Note that the TRANS 30 has at least one antenna to facilitate communication. The AN 16 is coupled via a data path 34 to one or more external networks or systems, such as the internet 36, for example. It is noted that FIG. 7 illustrates a single antenna at each end of the wireless link, although in practice there will be multiple antennas.

At least one of the PROGs 24, 32 is assumed to include program instructions that, when executed by the associated DP, enable the electronic device to operate in accordance with the exemplary embodiments of this invention, as discussed herein.

Figure 8:
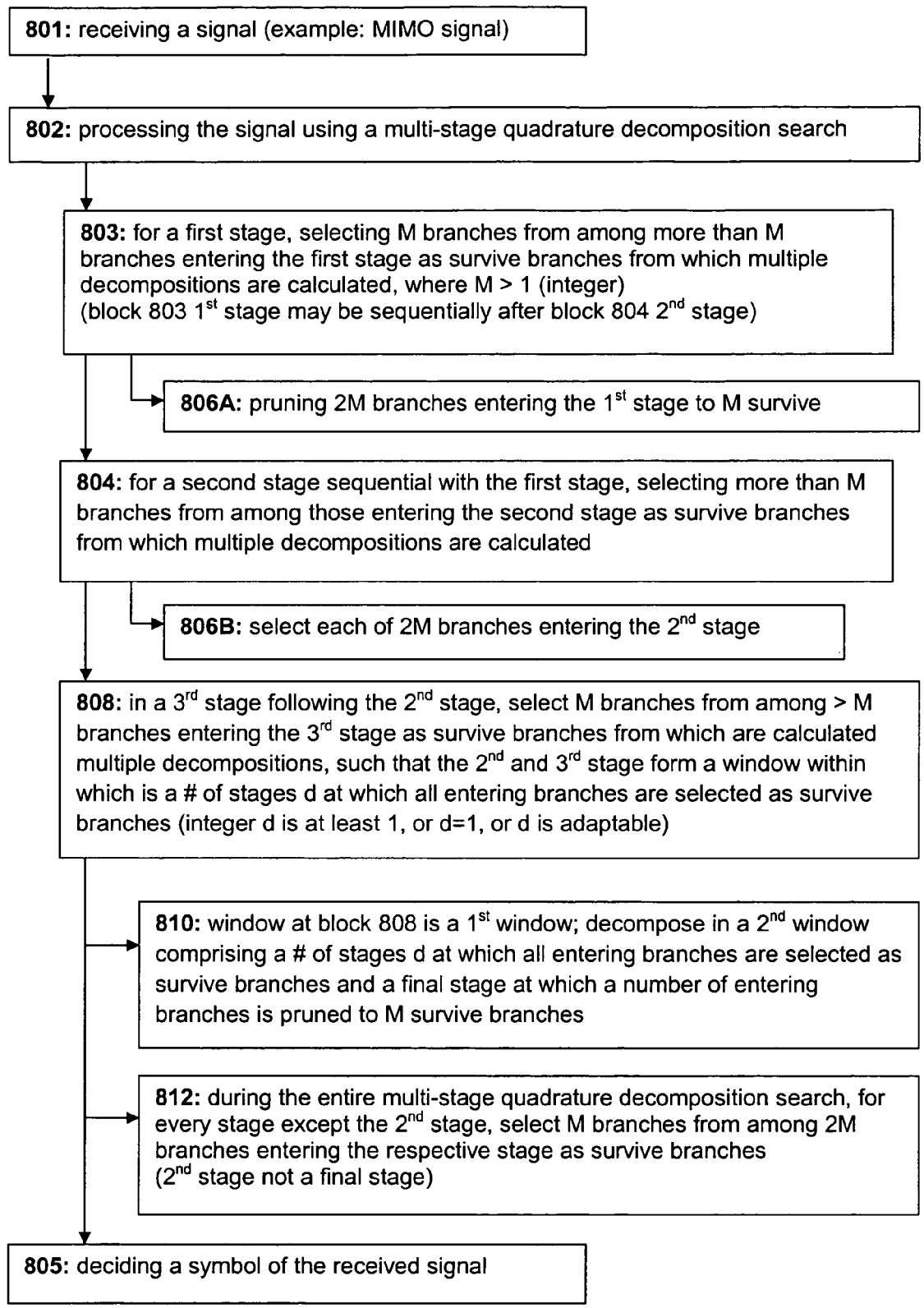
FIG. 8 is a process diagram illustrating various non-limiting exemplary embodiments of the invention.

Based on the foregoing it should be apparent that the exemplary embodiments of this invention provide a method, apparatus and computer program product(s) to perform a QRD-M search, wherein the QRD-M search uses a delayed branch decision mode, and where the M value is not increased. The received MIMO signal y is decomposed in stages, and for at least one stage all calculation branches from the previous stage are continued to another stage where all except M branches are discarded, and the M branches of the received signal are further processed. This is shown by example at FIG. 8 showing elements of an exemplary method at block 801 receiving a signal; and at block 802 processing the signal using a multi-stage quadrature decomposition search. The search is detailed further at blocks 803 and 804. For a first stage, M branches are selected from among more than M branches entering the first stage as survive branches from which multiple decompositions are calculated, where M is an integer greater than one. And for a second stage sequential with the first stage, more than M branches are selected from among those entering the second stage as survive branches from which multiple decompositions are calculated. Then at block 805 there is decided a symbol of the received signal.

Optionally for the first stage, the processor selecting M branches from block 803 comprises at block 806A the processor pruning 2M branches entering the first stage to M survive branches; and wherein for the second stage, the processor selecting more than M branches from block 804 comprises at block 806B the processor selecting each of 2M branches entering the second stage. At optional block 808 the processing further comprises, in a third stage following the second stage, the processor selecting M branches from among more than M branches entering the third stage as survive branches from which the processor calculates multiple decompositions, such that the second and third stage form a window within which is a number of stages d at which all entering branches are selected by the processor as survive branches, where d is an integer at least equal to one and in an embodiment d is equal to one. The window at block 808 may comprise a first window, in which case in an exemplary embodiment at block 810 the processing further comprises the processor decomposing in a second window comprising a number of stages d at which all entering branches are selected by the processor as survive branches and a final stage at which a number of entering branches is pruned by the processor to M survive branches. The processing at block 802 is further detailed at block 812 such that the processing during the entire multi-stage quadrature decomposition search further comprises, for every stage except the second stage, the processor selecting M branches from among 2M branches entering the respective stage as survive branches. In an exemplary embodiment for block 812 the second stage is other than a final stage of the multi-stage quadrature decomposition search. By example the signal at block 801 may comprise a multi-input multi-output MIMO signal, and the first stage processing at block 803 may be sequentially after the second stage processing at block 804.

In a further non-limiting aspect of the invention, the exemplary embodiments may be applied in a wireless communication system. In one embodiment, during the entire decomposition there is only one multi-stage window in which calculated branches are not discarded. In another embodiment there is only one stage within a window in which no discard decision is made. In another embodiment there are, within the decomposition of a received signal y, multiple windows each including a calculation stage at which no calculated branches are discarded. In another embodiment a multi-stage window includes more than one stage at which no discard decision is made.

Generally, the processing described herein may be by the processor (FIG. 7) and decisions as to surviving branches move through the sub-carrier detector (FIG. 1) for an ultimate symbol decision. Memory is used (preferably RAM or SRAM) in the form of a cache for storing calculated branches prior to survive/discard decision at the appropriate stages.

In general, the various embodiments of the UE 14 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by one or more of the DPs 18, 26 of the UE 14 and the AN 16, or by hardware, or by a combination of software and hardware.

The MEMs 20, 28 may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DPs 18, 26 may be of any type suitable to the local technical environment, and may include one or more of general purpose computers, special purpose computers, microprocessors, digital signal processors (DSPs) and processors based on multi-core processor architecture, as non-limiting examples. Based on the foregoing, it should be apparent that the exemplary embodiments of this invention provide a method, apparatus, and computer program product(s) to at least provide QuadRature Decomposition based M-searching signal detecting.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

Various modifications and adaptations may become apparent to those skilled in the relevant arts in view of the foregoing description, when read in conjunction with the accompanying drawings and the appended claims. As but some examples, the use of other similar or equivalent methods to at least provide QuadRature Decomposition based M-searching signal detecting may be attempted by those skilled in the art. However, all such and similar modifications of the teachings of this invention will still fall within the scope of this invention.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

We claim:

1. A method comprising:
receiving a signal at an apparatus;
processing the signal in a processor of the apparatus using a multi-stage quadrature decomposition search, wherein the processing comprises:
for a first stage, the processor selecting M branches from among more than M branches entering the first stage as survive branches from which multiple decompositions are calculated, where M is an integer greater than one;
and for a second stage sequential with the first stage, the processor selecting more than M branches from among those entering the second stage as survive branches from which multiple decompositions are calculated; and
the processor deciding a symbol of the received signal from a branch that is a survive branch of both the first and second stages.

2. The method of claim 1, wherein for the first stage, the processor selecting M branches comprises the processor pruning 2M branches entering the first stage to M survive branches; and wherein for the second stage, the processor selecting more than M branches comprises the processor selecting each of 2M branches entering the second stage.

3. The method of claim 2, wherein the processing further comprises, in a third stage following the second stage, the processor selecting M branches from among more than M branches entering the third stage as survive branches from which the processor calculates multiple decompositions, such that the second and third stages form a window within which is a number of stages d at which all entering branches are selected by the processor as survive branches, where d is an integer at least equal to one.

4. The method of claim 3, wherein d is equal to one.

5. The method of claim 3, wherein the window comprises a first window, and wherein the processing further comprises the processor decomposing in a second window comprising a number of stages d at which all entering branches are selected by the processor as survive branches and a final stage at which a number of entering branches is pruned by the processor to M survive branches.

6. The method of claim 1, wherein the processing during the entire multi-stage quadrature decomposition search further comprises, for every stage except the second stage, the processor selecting M branches from among 2M branches entering the respective stage as survive branches.

7. The method of claim 6, wherein the second stage is other than a final stage of the multi-stage quadrature decomposition search.

8. The method of claim 1, wherein the signal comprises a multi-input multi-output (MIMO) signal.

9. The method of claim 1, wherein the first stage is sequentially after the second stage.

10. A computer readable memory tangibly embodying a computer program and executable by a digital data processor, to perform actions directed toward performing a multi-stage quadrature decomposition search, the actions comprising, for an input signal:
for a first stage, selecting M branches from among more than M branches entering the first stage as survive branches from which multiple decompositions are calculated, where M is an integer greater than one;
and for a second stage sequential with the first stage, selecting more than M branches from among those entering the second stage as survive branches from which multiple decompositions are calculated; and
deciding a symbol of the received signal from a branch that is a survive branch of both the first and second stages.

11. The computer readable memory of claim 10, wherein for the first stage, selecting M branches comprises pruning 2M branches entering the first stage to M survive branches; and wherein for the second stage, selecting more than M branches comprises selecting each of 2M branches entering the second stage.

12. The computer readable memory of claim 11, wherein the actions further comprise, in a third stage following the second stage, selecting M branches from among more than M branches entering the third stage as survive branches from which multiple decompositions are calculated, such that the second and third stages form a window within which is a number of stages d at which all entering branches are selected as survive branches, where d is an integer at least equal to one.

13. The computer readable memory of claim 12, where d is equal to one.

14. The computer readable memory of claim 12, where d is adaptable.

15. The computer readable memory of claim 12, wherein the window comprises a first window, and wherein the processing further comprises decomposing in a second window comprising a number of stages d at which all entering branches are selected as survive branches and a final stage at which a number of entering branches is pruned to M survive branches.

16. The computer readable memory of claim 10, wherein performing the multi-stage quadrature decomposition search comprises, for every stage except the second stage, selecting M branches from among 2M branches entering the respective stage as survive branches.

17. The computer readable memory of claim 16, wherein the second stage is other than a final stage of the multi-stage quadrature decomposition search.

18. The computer readable memory of claim 10, wherein the signal comprises a multi-input multi-output (MIMO) signal.

19. The computer readable memory of claim 10, wherein the first stage is sequentially after the second stage.

20. An apparatus, comprising:
at least one processor;
at least one memory including a computer program;
in which the at least one memory and the computer program are configured to, with the at least one processor, cause the apparatus at least to:
process an input signal using a multi-stage quadrature decomposition search by:
for a first stage, selecting M branches from among more than M branches entering the first stage as survive branches from which multiple decompositions are calculated, where M is an integer greater than one;
and for a second stage sequential with the first stage, selecting more than M branches from among those entering the second stage as survive branches from which multiple decompositions are calculated; and
deciding a symbol of the received signal from a branch that is a survive branch of both the first and second stages.

21. The apparatus of claim 20, wherein for the first stage, selecting M branches comprises pruning 2M branches entering the first stage to M survive branches; and wherein for the second stage, selecting more than M branches comprises selecting each of 2M branches entering the second stage.

22. The apparatus of claim 21, wherein the at least one memory and the computer program are configured with the at least one processor to cause the apparatus at least to further process the input signal using the multi-stage quadrature decomposition search by, in a third stage following the second stage, selecting M branches from among more than M branches entering the third stage as survive branches from which multiple decompositions are calculated, such that the second and third stage form a window within which is a number of stages d at which all entering branches are selected as survive branches, where d is an integer at least equal to one.

23. The apparatus of claim 22, wherein the window comprises a first window, and wherein the processing further comprises decomposing in a second window comprising a number of stages d at which all entering branches are selected as survive branches and a final stage at which a number of entering branches is pruned to M survive branches.

24. The apparatus of claim 22, wherein the at least one memory and the computer program are configured with the at least one processor to cause the apparatus at least to process the input signal using the multi-stage quadrature decomposition search by, for every stage except the second stage, selecting M branches from among 2M branches entering the respective stage as survive branches.

25. An apparatus comprising:
means for receiving a wireless signal; and
means for decomposing the received signal according to a multi-stage quadrature decomposition by:
for a first stage, selecting M branches from among more than M branches entering the first stage as survive branches from which multiple decompositions are calculated, where M is an integer greater than one;
and for a second stage sequential with the first stage, selecting more than M branches from among those entering the second stage as survive branches from which multiple decompositions are calculated; and
deciding a symbol of the received signal from a branch that is a survive branch of both the first and second stages.

26. The apparatus of claim 25, wherein the means for receiving comprises a receiver and the means for decomposing comprises a processor executing a computer program embodied on a memory coupled to the processor.

* * * * *